Feb. 14, 1961  S. W. MUNSON  2,971,723
ANTENNA JETTISON ATTACHMENT
Filed Aug. 16, 1956

INVENTOR.
STANLEY W. MUNSON
BY
ATTORNEYS

United States Patent Office 2,971,723
Patented Feb. 14, 1961

2,971,723
ANTENNA JETTISON ATTACHMENT
Stanley W. Munson, R.R. 2, New Carlisle, Ohio Filed Aug. 16, 1956, Ser. No. 604,575

4 Claims. (Cl. 244—1)

(Granted under Title 35, U.S. Code (1952), sec. 266)

The invention described herein may be manufactured and used by or for the United States Government for governmental purposes without payment to me of any royalty thereon.

The invention relates to jettisoning of a broken aircraft antenna wire and, more particularly, to a device for severing the attachment of the end of an aircraft antenna when the wire has been broken and would otherwise dangle about the aircraft, become entangled causing critical damage.

The aircraft industry has long been aware of a need for severing an antenna wire which has been broken and which dangles about the craft indiscriminately and becomes a hazard to critical portions of the plane. The devices heretofore used for this purpose have been complicated, assembled with difficulty and intricate in structure. Some of them have depended solely upon release of tension and were subject to unwanted release when the tension was only momentarily relaxed.

The object of the present invention is the provision of a device for the release of aircraft antenna wire which overcomes the difficulties mentioned above.

A further object of the invention is the provision of an antenna release device which is simple in structure, easily manufactured and is positive and sure in its operation.

A still further object of the invention is the provision of a device for securing one end of an aircraft antenna wire in such a manner that the connection is held operative by tension, and when this tension is removed, as would be the case when the antenna wire is broken, a lateral movement will sever the connection and the antenna wire will fall free from the aircraft thus relieving a dangerous situation where the loose and dangling wire could become entangled and cause critical damage.

A further object of the invention is the provision of a safety device for releasing a broken antenna wire from an aircraft, which requires lateral movement in addition to tension release, thus relieving a condition where a momentary relaxation of tension would cause release of an antenna even though it were still intact.

Figures 4 and 5 show a detail of a modified form of socket element formed for pivotal attachment to the aircraft.

Figure 1:
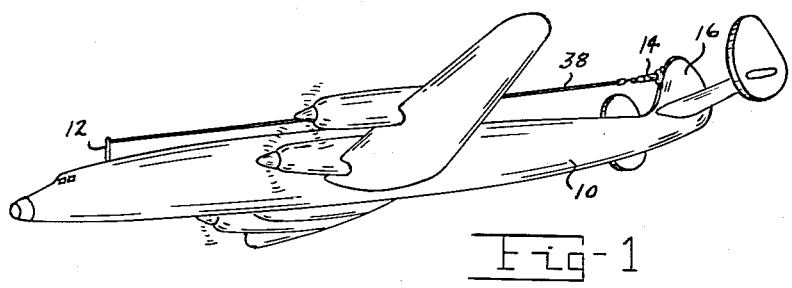
Figure 1 is a view of an aircraft showing the antenna wire and releasing device installation.

Referring more in detail to the drawings an aircraft is indicated generally by the numeral 10. The antenna installation is shown schematically as attached to the antenna 12. In the form of the device shown in Figure 2 the device is made adaptable for attachment to the end of a relay 14, which in turn is secured by any desired means such as the bracket 18 to a desired location on the aircraft.

The relay 14 is provided with an end portion 20 which has a screw threaded bore 22 and a screw threaded counterbore 24. The socket member 26, which is a swivel, or the socket portion of a ball and socket joint, is secured to the end portion 20 by means of, first, inter-engaging screw threads at 22 and further, the screw threaded pin 28, received in a bore 30 in the member 20. The threads on the pin 28 are of a finer, or at least a different pitch than the threads at 22, so that the loosening effect of jars and jolts on one connection is resisted by the other connection. The outer end of the swivel bracket 26 is provided with a pair of restricted jaws 29 and a transverse opening completely through its transverse extent. The interior surfaces of the jaws 29 are formed with complementary rounded out portions shown at 34, for receiving the ball part of the joint, later described.

Figure 2:
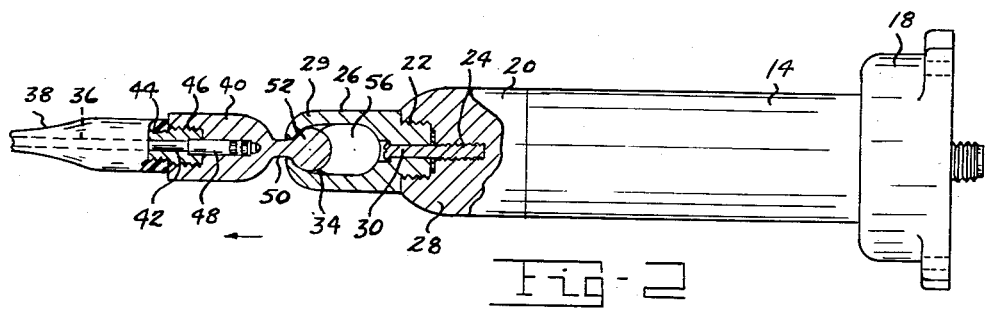
Figure 2 is a detail view of the device partly in cross section.
Figure 4:
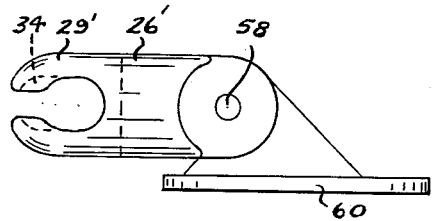
Figure 4 is a side elevation of the jaws of Figure 2, showing a modified pivoted form of bracket attachment.
Figure 5:
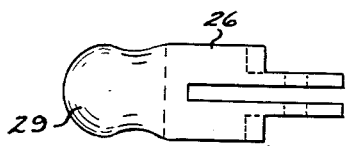
Figure 5 is a top plan view of the modification shown in Figure 4.

Although Figure 4 shows a modified form of attaching the swivel member to an aircraft or other base or standard directly by a bracket, where the relay is omitted, the jaws 29 are identical in these two forms. Figure 2 shows the jaws in vertical cross section and Figure 4 shows them in side elevation.

The connecting assembly for attaching the antenna wire 36 to the swivel member 26 is composed of the following parts:

The antenna wire 36 together with its insulating sheath is led through the member 38 which is made of rubber, plastic or other desired insulating material, and is provided with an axial cylindrical opening throughout its length for receiving the antenna wire 36. A link member 40 is attached to the sheath 38 by means of an inset 42. The inset member 42 is provided with two sets of external screw threads, one located on a reduced portion 44 and engageable in complementary screw threads provided in the sheath 38, the other set engaging an internally screw threaded bore 46 provided in the link 40. The link member 40 is provided with a counter-bore for receiving a chuck 48. The antenna wire extends through the sheath 38, through the inset 42 and is clamped within the chuck member 48 by standard known means (not shown). The link member 40 is provided with a reduced annular neck portion 50 and a ball or spherical portion 52. The ball portion 52 is of such size and shape as to fit within the rounded interior of the jaws 28, and when tension is consistently exerted in the direction shown by the arrow in Figure 2, will remain held securely in the rounded out portion 34 by the restriction of the jaws 28.

When, however, this tension is removed as would happen if the antenna wire were released at the other end or would be broken, the member 52 slides backward encountering an aperture 56 between the jaws 28 of a diameter sufficient to allow its passage therethrough. Rotation in a horizontal plane of the antenna and the member 40 about the members 52 as a center will also effect its release from the bracket 28.

Figure 3:
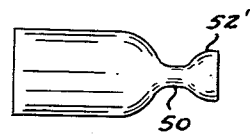
Figure 3 is a modification of one portion of the device.

Figure 3 shows a modified form of the ball member 52. The ball member 52' is formed in substantially the shape of a hemisphere. Simplified machining operations are involved, and the hemisphere was found to perform adequately the functions performed by the completed sphere. It will be understood that any gradation between a hemisphere and a completely round ball lie within the scope of the present invention.

As will now be apparent in the installation of the device the sphere 52 or hemisphere 52' is inserted into the enlarged opening 56 in the bracket 26; it is pulled forward in the direction of the arrow in Figure 2, fitting into the rounded complementary interior portion of the jaws 29 and held therein by the restriction of the jaws. The connection thus accomplished will remain secure in attachment as long as tension is maintained upon the antenna wire. When this tension is relaxed the spherical portion 52' or hemispherical portion 52' would slide directly backward. If the condition is a momentary one, and the antenna is still intact, these members slide back into place. If, however, the antenna is broken, there will be a lateral impact, and the member 52 or 52' will slide through the opening 56 and be freed. When the relay 14 is not included in the installation, the swivel socket 26' shown in Figure 4 may be secured to the aircraft or other desired standard by a pivotal connection 58 through a bracket 60. The jaw members 29' on the socket 26' are in every regard identical in form and function to the swivel portion of the bracket 26.

While the invention is shown and described in connection with one form for illustrative, rather than restrictive purposes, it is obvious that minor changes and modifications may be made by those skilled in the art without departing from the scope and spirit of the invention as defined in the accompanying claims.

I claim:

1. An antenna jettison attachment for aircraft comprising a relay attached to a support on said aircraft, a bracket on said relay provided with an internally threaded bore and an internally threaded counterbore, the threads of said bore and counterbore being of a different pitch, a swivel member, a reduced threaded portion on said swivel member for receiving in the bore of said bracket member, a bore in said swivel member, a screw threaded pin receivable in said bore and threadedly engaging the counterbore in said bracket, the other end of said swivel member being provided with a pair of restricted jaws and a horizontal opening completely through its transverse extent, said jaws being provided with an internal spherically formed surface, the transverse opening being enlarged in the midportion of said swivel member, a link, means on said link for attaching the end of an antenna wire, a ball portion on said link receivable in the interior spherically formed surface of said jaws, a neck portion connecting said link and said ball and receivable between the restricted portion of said jaws, said enlarged opening being of such a diameter as to allow passage of said ball member.

2. An aircraft, an antenna wire extending fore and aft of the exterior of said aircraft, a fixed attachment for the fore end of said antenna, antenna jetttison means for said antenna comprising a swivel member attached to a rearwardly positioned support, a link element connected to said antenna, said swivel member having oppositely disposed upper and lower jaws, a spherically formed socket formed on complementary interior surfaces of said jaws, a ball and a neck portion on said link, said ball being received and held within said jaws, a transverse opening through the entire width of said swivel member, said opening having an enlarged midportion rearwardly positioned with respect to said jaws and of sufficient diameter to allow freeing of said ball for releasing of said antenna, said ball being freed only when tension upon it is released, accompanied by lateral displacement of said ball.

3. A vehicle, an antenna secured to the exterior of said vehicle at fore and aft positions, a fixed attachment for said antenna at its forward end, a socket attachment for releasably attaching the rearward end of said antenna to said vehicle and jettisoning said antenna when said antenna has been broken, said attachment comprising a socket secured to said vehicle, a pair of upper and lower jaws on said socket, said jaws being provided with interior complementary spherical surfaces, a ball member attached to the end of said antenna and receivable between said jaws for holding said antenna in taut and operating position, a transverse opening entirely through the width of said socket and located rearwardly of said jaws, said opening being of such width as to allow passage and freeing of said ball when lateral movement of said ball accompanied by release of tension occurs.

4. A vehicle, an antenna wire mounted exteriorly on said vehicle, attaching means for attaching the ends of said antenna wire at locations fore and aft on the exterior of said vehicle, means for releasing at least one of said attaching means and jettisoning said antenna under lateral displacement and continued absence of tension, said means comprising a spherical member on said antenna, a socket secured to said vehicle, upper and lower jaws on said socket, said upper and lower jaws having complementary interior spherical surfaces, said socket having also an enlarged transverse opening entirely therethrough, located rearwardly of said jaws and of sufficient width to allow passage of said spherical member.

References Cited in the file of this patent

UNITED STATES PATENTS

| 66,244    | Moulton  | July 2, 1867  |
| 1,403,553 | Horn     | Jan. 17, 1922 |
| 2,036,172 | Gagnon   | Mar. 31, 1936 |
| 2,191,812 | Warren   | Feb. 27, 1940 |
| 2,461,031 | Brickman | Feb. 8, 1949  |
| 2,823,379 | Novak    | Feb. 11, 1958 |